United States Patent [19]
Schmidt

[11] Patent Number: 5,967,614
[45] Date of Patent: Oct. 19, 1999

[54] SEAMLESS THERMOFORMED VEHICULAR SEAT COVER, AND METHOD AND APPARATUS FOR MAKING SAME

[76] Inventor: William P. Schmidt, 20950 Woodruff, Rockwood, Mich. 48173

[21] Appl. No.: 09/054,651

[22] Filed: Apr. 3, 1998

[51] Int. Cl.[6] .................................................. A47C 7/24
[52] U.S. Cl. ............................. 297/452.58; 297/452.59; 297/219.1; 297/225; 297/228; 297/229; 297/218.2; 297/218.3
[58] Field of Search ........................ 297/452.58, 452.59, 297/218.2, 218.3, 219.1, 228, 225, 229

[56] References Cited

U.S. PATENT DOCUMENTS

| | | | |
|---|---|---|---|
| 2,822,862 | 2/1958 | Zacks | 297/229 |
| 2,844,192 | 7/1958 | Marquez | 297/452.58 |
| 3,180,681 | 4/1965 | Buralli | 297/229 |
| 3,628,830 | 12/1971 | Mitjans | 297/218.3 X |
| 3,695,692 | 10/1972 | Williams | 297/229 |
| 3,892,440 | 7/1975 | Dudley et al. | 297/229 |
| 4,232,899 | 11/1980 | Fister, Jr. | 297/229 |
| 4,669,779 | 6/1987 | Kaganas et al. | 297/229 |
| 4,676,376 | 6/1987 | Keiswetter | 297/229 X |
| 4,723,814 | 2/1988 | Hunt | 297/219.1 |
| 4,789,201 | 12/1988 | Selbert | 297/452.59 X |
| 4,834,451 | 5/1989 | Meunier et al. | 297/452.59 X |
| 4,906,516 | 3/1990 | Okamura et al. | |
| 5,000,805 | 3/1991 | Lowe | 156/90 |
| 5,265,933 | 11/1993 | Croshaw | 297/228.1 |
| 5,403,066 | 4/1995 | Drum | 297/219.1 |
| 5,448,938 | 9/1995 | Fernandez et al. | 297/229 X |
| 5,468,434 | 11/1995 | Powell et al. | 264/46.8 |
| 5,494,330 | 2/1996 | Fotsch | 297/219.1 X |
| 5,615,425 | 4/1997 | Corente | 297/229 X |
| 5,655,813 | 8/1997 | Kirkpatrick | 297/229 |
| 5,709,431 | 1/1998 | Horn | 297/228.1 X |

*Primary Examiner*—Peter M. Cuomo
*Assistant Examiner*—Rodney B. White
*Attorney, Agent, or Firm*—Weintraub & Brady, P.C.

[57] ABSTRACT

A thermoforming apparatus for fabricating seamless vehicle seat covers includes a clamp assembly for clamping and holding a thermoplastic sheet, a heater for heating material held by the clamp assembly, and a female cavity mold having a base section and a backrest section. The mold has an internal vacuum passageway formed therein, and also includes an external vacuum port for connecting to a source of vacuum. The vacuum port is in fluid communication with the internal vacuum passageway. A vacuum conduit connects the vacuum port to a vacuum source, by way of an electrically operable valve in fluid communication with the vacuum port. A method of thermoforming a seamless vehicle seat cover, and a seamless vehicular seat cover, which is a product of a thermoforming process, are also included.

3 Claims, 5 Drawing Sheets

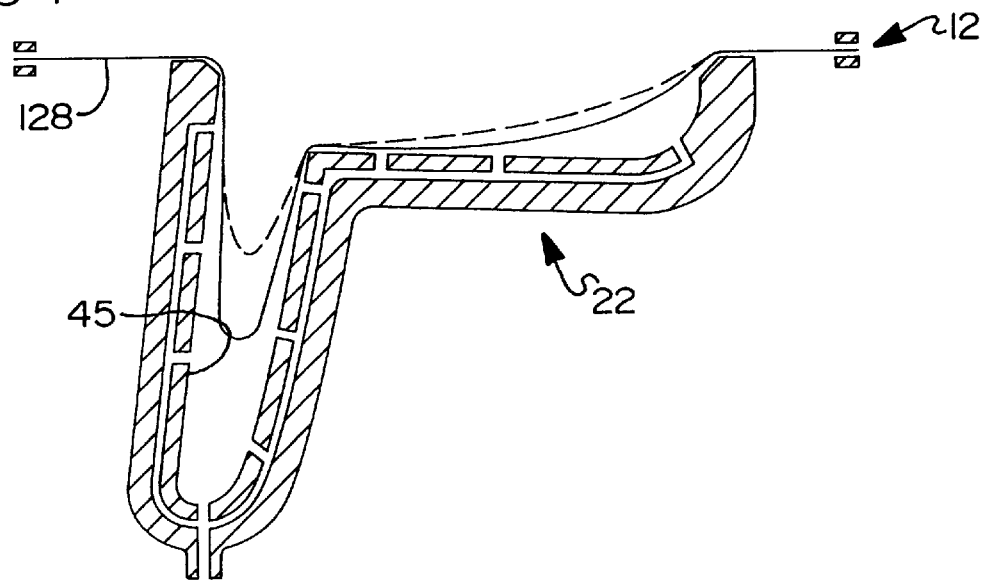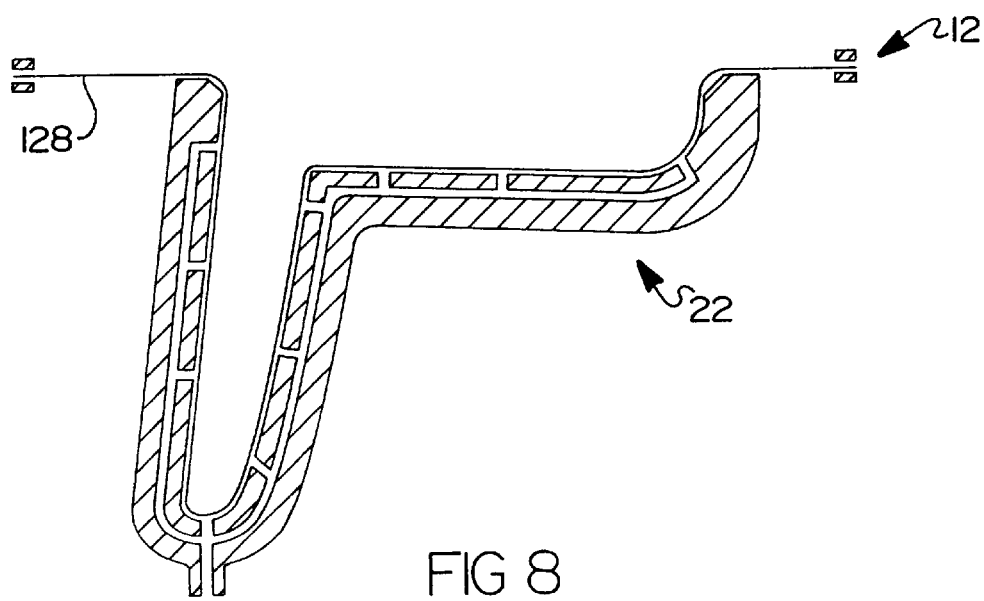

SEAMLESS THERMOFORMED VEHICULAR SEAT COVER, AND METHOD AND APPARATUS FOR MAKING SAME

BACKGROUND OF THE INVENTION

1. Field of the Invention

The present invention relates to a seamless seat cover for a vehicle seat, and to a method and apparatus for making such a seat cover. More particularly, the present invention relates to a thermoforming apparatus, a method of using that apparatus to produce a seamless vehicular seat cover, and to a seamless vehicular seat cover which is a product of a thermoforming process.

2. Description of the Background Art

Many different types of automotive seat covers are commercially available on the marketplace today. A variety of patents have been issued for various types of vehicular seat covers. U.S. Pat. No. 3,695,692 discloses a temporary "plastic bag" type of protective seat cover, for installation on a vehicular seat during assembly line production. Other examples of some issued patents on seat covers are U.S. Pat. Nos. 3,892,440, 4,232,899, 4,669,779, 5,265,933, 5,403,066, 5,655,813, and 5,709,431.

U.S. Pat. No. 4,906,516 discloses a leather-like foam sheet for general use in a vacuum forming process. Some methods are known for using thermoforming processes to make composite vehicle seats and components thereof, such as are disclosed in U.S. Pat. Nos. 5,000,805 and 5,468,434.

New governmental regulations are expected to go into effect shortly, which will require seat covers for use in emergency vehicles, such as police, fire, and ambulance rescue vehicles, to be seamless. This is because of the possible risk of contamination if pathogenic material should become trapped in seams of a seat cover in an emergency vehicle. In particular, a risk exists that blood of an individual with the HIV virus, who has been in an accident or emergency situation, may become spilled on a seat cover in an emergency vehicle, and even after cleanup, some of this blood may remain in the seams of a seat cover and may pose a health risk.

As a result, a need exists in the art for a seamless protective vehicle seat cover, for placing over and protectively covering a vehicle seat assembly. In particular, a need exists for a seamless protective vehicular seat cover which is relatively inexpensive and simple to produce, yet which can be manufactured reliably in volume.

SUMMARY OF THE INVENTION

In one aspect hereof, the present invention provides a seamless vehicular seat cover which is a product of a thermoforming process. A seat cover in accordance with the present invention is provided for slidably placing over a vehicular seat to protectively cover the seat, is made of a thermoplastic material, and includes a base section for covering and protecting a seat base, and a backrest section for covering and protecting a backrest portion of a seat.

In another aspect hereof, the present invention provides a thermoforming apparatus for fabricating seamless vehicle seat covers. An apparatus in accordance with the present invention, generally, includes a clamp assembly for clamping and holding a thermoplastic sheet, a heater for heating material held by the clamp assembly, and a female cavity mold having a base section and a backrest section. The mold has an internal vacuum passageway formed therein, and also includes an external vacuum port for connecting to a source of vacuum. The vacuum port is in fluid communication with the internal vacuum passageway. The apparatus according to the present invention also includes an electrically operable flow control valve in fluid communication with the vacuum port.

In yet another aspect hereof, the present invention also encompasses a method of thermoforming a seamless vehicle seat cover. A method in accordance with the present invention includes the steps of a) clamping a thermoplastic sheet in a clamp assembly;

b) heating the thermoplastic sheet;

c) contacting the thermoplstic sheet with a female cavity mold having a base section and a backrest section, the mold having an internal vacuum passageway formed therein, the mold further comprising a vacuum port for connecting to a source of vacuum, the vacuum port being in fluid communication with the internal vacuum passageway; and d) applying a vacuum to the vacuum port to lower pressure inside the mold and thereby pull the thermoplastic sheet downwardly into the mold.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIGS. 6–8 are a sequential series of cross-sectional views of the apparatus of FIG. 5 at different times during a vacuum forming operation, showing the formation of a seamless vehicular seat cover therein.

DETAILED DESCRIPTION OF THE PREFERRED EMBODIMENT

OVERVIEW

Figure 1:
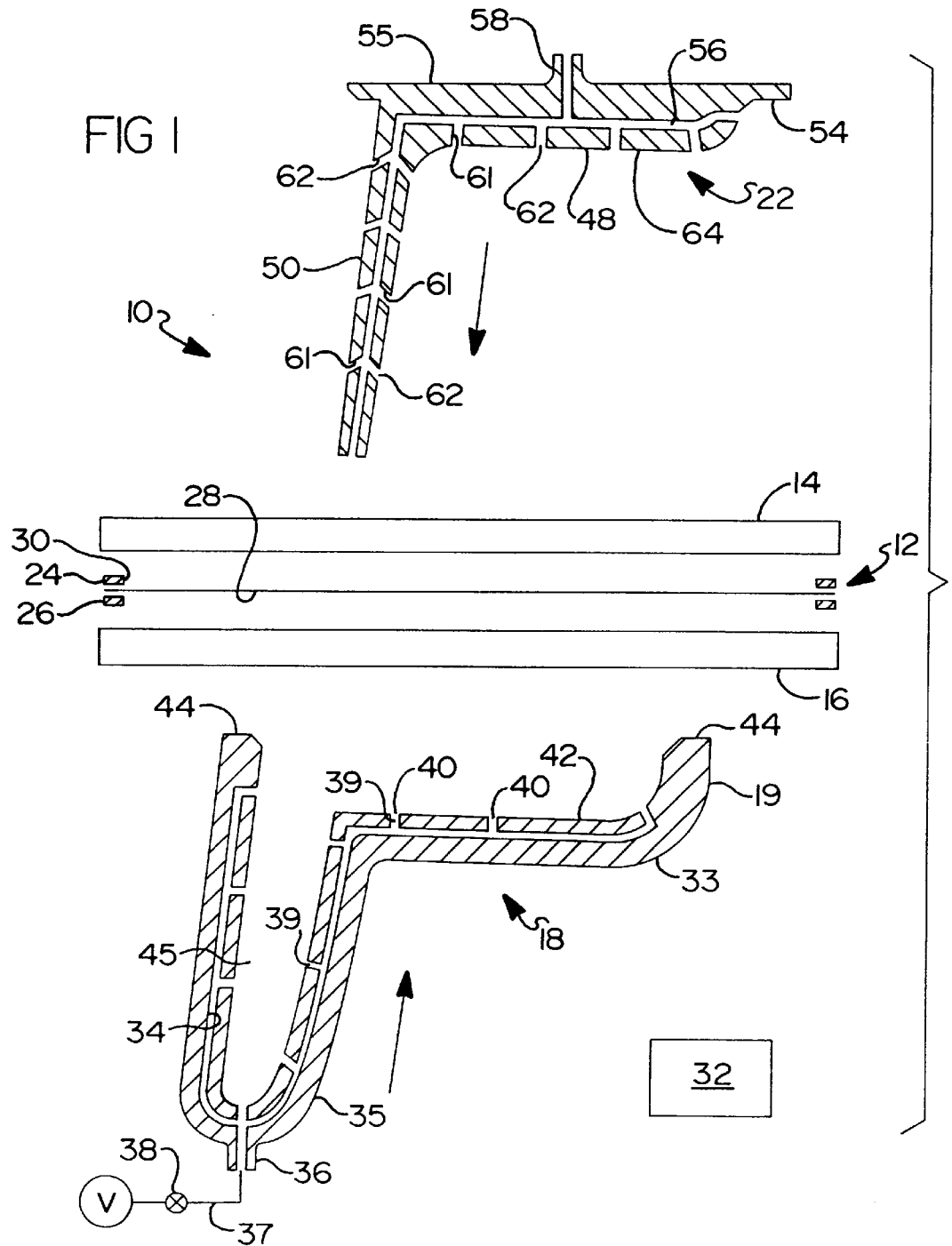
FIG. 1 is a side plan view, partially in cross-section, and including a partial schematic diagram, of a thermoforming apparatus in accordance with the present invention, at a first or heating stage of a thermoforming process.
Figure 4:
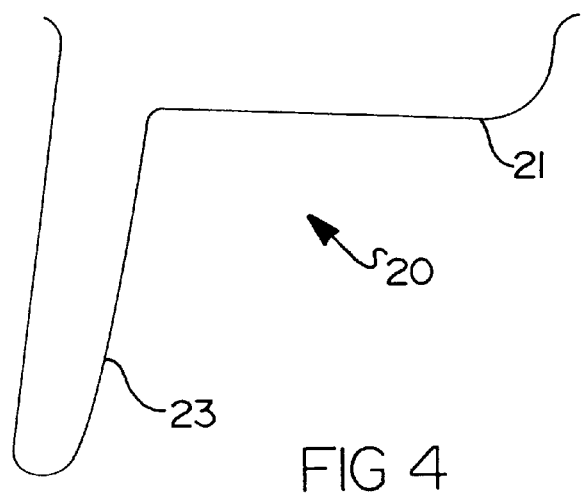
FIG. 4 is a cross-sectional view of a seamless seat cover which is a product of the apparatus of FIGS. 1–3.

Referring now to FIG. 1 of the drawings, a thermoforming apparatus is shown generally at 10. The apparatus 10 is particularly designed for thermoforming seamless vehicular seat covers, such as that shown at 20 in FIG. 4. The apparatus 10 includes a clamp assembly 12, a movable upper heater 14, a movable lower heater 16, and a female mold 18. In one embodiment thereof, the apparatus 10 also includes a male plug 22 for aligning with the mold 18 in a thermoforming operation. Each of these components of the apparatus 10 will be discussed in further detail hereinbelow.

As used throughout the present specification and in the claims, and as widely used in the relevant art, the term "thermoforming" is a generic descriptive word referring generally to any type of heated thermoplastic sheet-forming method, and includes vacuum forming, pressure forming, plug-assist forming, matched mold forming, and any combination of these methods. A general discussion of thermoforming may be found in *Practical Thermoforming— Principles and Applications* by John Florian, published by Marcel Dekker, Inc. N.Y. 1987. Thermoforming, per se, is a well established industry.

THE CLAMP ASSEMBLY

Figure 5:
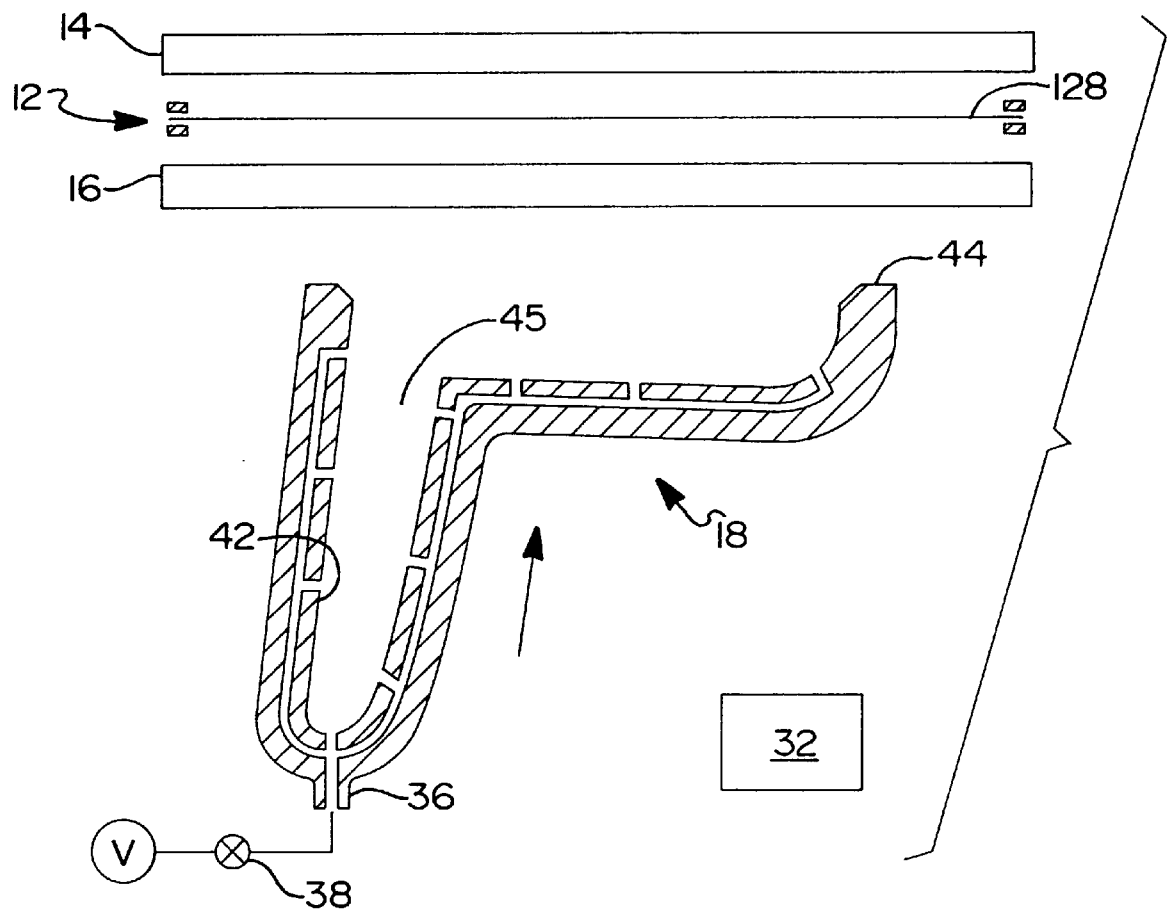
FIG. 5 is a side plan view, partially in cross-section, of the apparatus of FIG. 1, modified by deleting male plug therefrom.

The clamp assembly 12 includes an upper section 24 and a lower section 26 for clamping a generally rectangular thermoplastic sheet 28, 128 (FIG. 5) therebetween, preferably grasping all four side edges of the sheet 28, 128 in order to hold it steady during operation of the apparatus 10. The clamp assembly 12 may be a frame type of clamp, having two rectangular framelike components which are pivotally joined together by a hinge. Alternatively, the clamp assembly 12 may be a transport chain in the case of a continuously fed automated apparatus. Where a continuously fed automated apparatus is used, mechanical clamp bars for the sides of the thermoplastic sheet 28 are preferred to be included as part of the clamp assembly 12, because of the depth of the mold 18, and the consequent stresses that are placed on the thermoplastic sheet 28 during molding. The clamp assembly 12 may incorporate one or more temperature sensors 30, which are in electrical communication with a system monitor and control box 32 via conventional wiring (not shown). The control box 32 preferably includes a computer.

THERMOPLASTIC SHEET MATERIAL

The material used for the sheet material 28, 128 should be tear-resistant and easily moldable in a thermoforming operation. The invention is adaptable for use with both manually fed and robotically or continuously fed thermoplastic sheet stock. Suitable materials for use in the practice of the present invention include polyethylene, polypropylene, and polyvinyl chloride. The sheet material 28 may be foamed, textured, printed with a pattern, or otherwise pretreated before thermoforming, if so desired.

HEATERS

Figure 2:
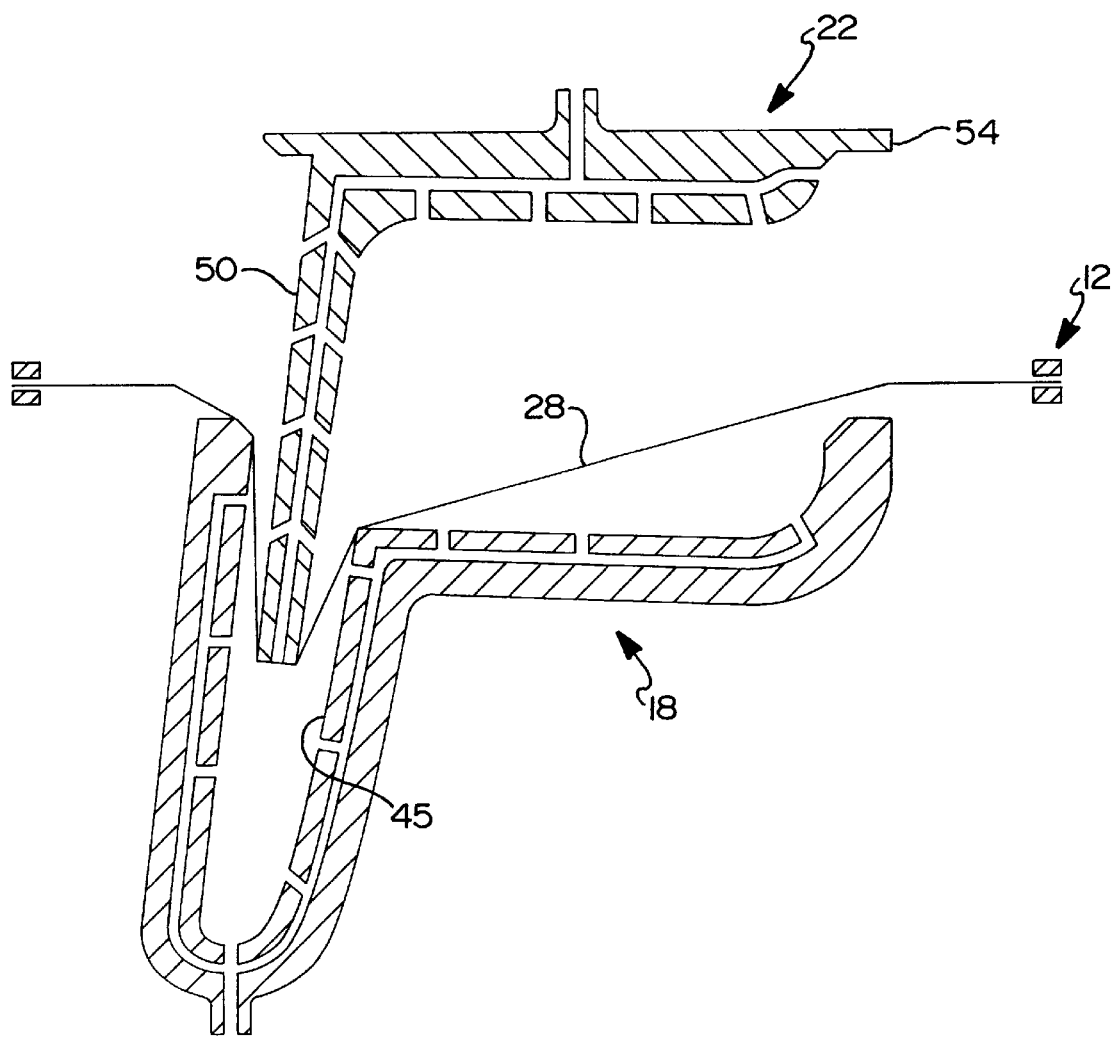
FIG. 2 is a cross-sectional view of the apparatus of FIG. 1, at a time subsequent to that of FIG. 1, when the heaters thereof have been moved out of the way.
Figure 3:
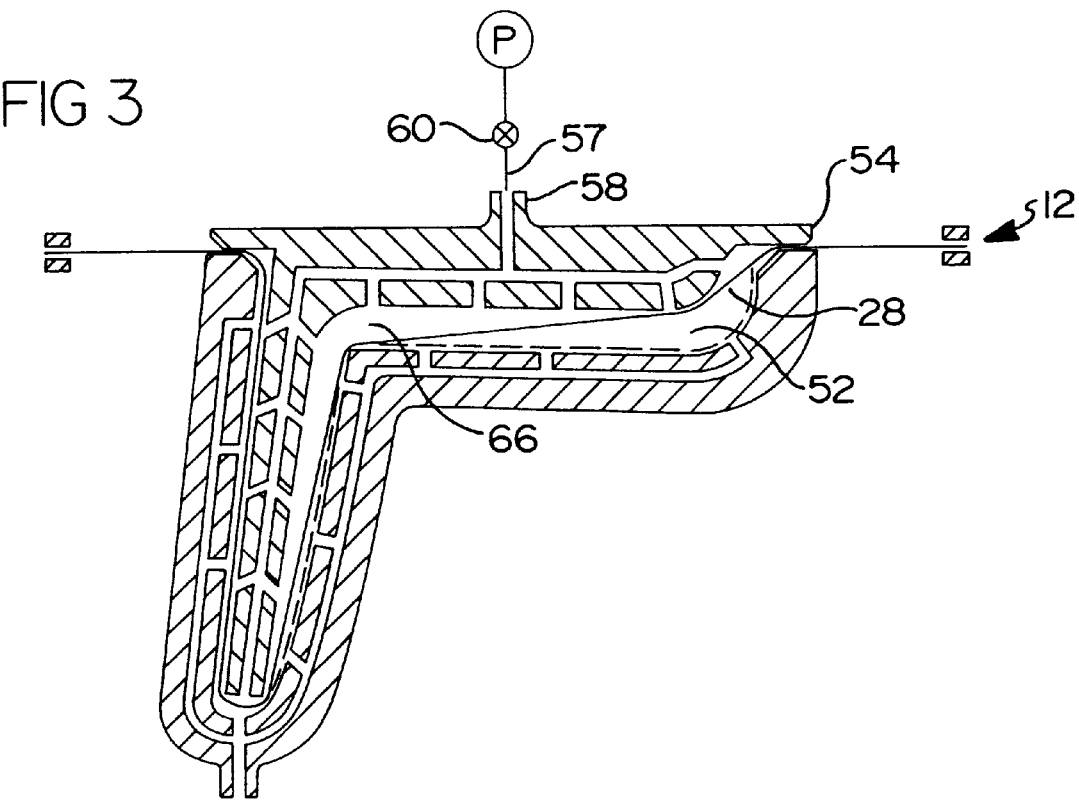
FIG. 3 is a cross-sectional view, including a partial schematic diagram, of the apparatus of FIGS. 1-2, at a time subsequent to that of FIG. 2, with a plug fully seated in a mold, and showing a further subsequent position of a thermoplastic sheet in phantom.

The heaters 14, 16 are provided to preheat the thermoplastic sheet 28, 128 in order to prepare it for molding in the mold 18. As noted, the heaters 14, 16 are constructed and arranged to be movable, so they can be removed from the orientation shown in FIG. 1, in order to make room above and below the sheet 28, for the mold 18 and the plug 22 to come together and moldingly clamp the thermoplastic sheet 28 therebetween, as shown in FIGS. 2-3. Various types of heating devices are well known and are available in the industry, and the specific type of heater selected depends on the application. Illustrative examples of types of heaters which are usable in the practice of the present invenion include quartz, ceramic, tube, and radiant heaters. The type of heater used is not critical in the practice of the present invention. Operation of the heaters 14, 16 is controlled by the control box 32.

THE MOLD

The mold 18 is the primary forming device according to the present invention. Preferably, the mold 18 is made of cast aluminum. The mold 18 is intended for vacuum forming a thermoplastic sheet 28, 128 to conform it to the shape and dimensions thereof to form a seat cover 20, with possible assistance, optionally, from the male plug 22.

Although the preferred approach in the practice of the present invention is to use the mold 18 together and in cooperation with a male plug 22, the mold 18 can be used without requiring the presence of a plug 22 in a vacuum forming process, without departing from the scope of the present invention, and indeed, the use of the mold 22 without the plug 18 is discussed herein in connection with FIGS. 5–8.

Although the primary mold 18 in the depicted embodiment is a female cavity mold, as an alternative, a male or drape mold could be used in the practice of the present invention. The female cavity mold, however, is preferred because of its ability to provide surface detail on the exterior surface of the finished seat cover 20.

The mold 18 is formed in the general shape of an inverted, or upside down, vehicular seat. While the mold 18 in the depicted embodiment is shown in the shape of a bench type seat, it could also be made in the shape of a bucket seat, or of a seat specific to a particular make and model of vehicle. It is contemplated that the mold could be removable and replaceable, and the apparatus 10 could be used to make many different varieties of car and truck seat covers, as desired, using a different mold for each one.

The mold 18 includes a base section 33 and a backrest section 35 which is connected to, and which is integrally formed with, the base section 33. The base section 33 of the mold is provided for molding and shaping a base section 21 of a vehicle seat cover 20, for protectively covering a base portion of a vehicle seat. In similar fashion, the backrest section 35 of the mold is provided for molding and shaping a backrest section 23 of a vehicle seat cover 20, for protectively covering a backrest portion of a vehicle seat. The backrest section 35 extends away from the base section 33 at an angle which is slightly greater than 90 degrees. The exact shape and relationship of the base section 33 and the backrest section 35 could be modified for any given seat cover to be manufactured.

The mold 18 is made up of a substantially continuous wall 19, which surrounds and defines an interior cavity 45 within the mold. The interior cavity 45 is open at the top thereof, as shown, for receiving a thermoplastic sheet 28 therein, which is molded into a seat cover 20. The mold 18 has a hollow vacuum port 36 thereon, extending downwardly from the lowermost portion of the backrest section 35, for connecting to a vacuum pump, reservoir or other source of vacuum V, which is selectively controllable by the control box 32 at a first flow control valve 38. The wall 19 has an internal vacuum passageway 34 formed therein, which is in fluid communication with the vacuum port 36. The vacuum source V is connected to the vacuum port 36 by a conventional supply line 37. The first flow control valve 38 may be an electric solenoid valve, diaphragm, or other type of electrically controllable valve. The vacuum passageway 34 is also in fluid communication with a plurality of branches 39, which interconnect the passageway to the internal mold cavity 45. The branches 39 terminate at a plurality of apertures 40, which are spaced around the interior surface 42 of the mold 18 to provide vacuum to the internal mold cavity 45 thereof The top edge 44 of the mold wall 19 is flattened therearound to provide a seal thereat when the edge 44 contacts the heat-softened thermoplastic sheet 28. The top edge 44 of the mold 18 is shown about to contact the thermoplastic sheet 28 in FIG. 2.

THE PLUG (OPTIONAL)

As noted above, the male plug 22 is provided for aligning with the mold 18 in a plug-assisted thermoforming operation. The plug 22 is also preferred to be formed of cast aluminum. Like the mold 18, the plug 22 includes a base section 48 and a backrest section 50. The backrest section 50 of the plug 22 serves to pre-stretch an area of the thermoplastic sheet 28 which is going to be forced into the backrest section 35 of the mold 18. Although the external shape of the plug 22 mirrors the internal shape of the mold 18, in the embodiment of FIGS. 1–4, the exterior of the plug 22 is not an exact match for the internal surface of the mold 18. As seen in FIG. 3, some air space 52 is left therebetween when the plug 22 is completely nested into the mold 18. However, the plug 22 could be made larger to be a close match for the interior mold cavity 45 of the mold, in which case the process would be matched molding instead of plug-assist forming.

The plug 22 has an external flange 54 extending outwardly from the base section 48 thereof to form an airtight seal with the thermoplastic sheet 28 when the plug is completely nested into the mold 18. The plug 22 also has a hollow air inlet 58 extending upwardly from the center of the top surface 55 thereof The plug 22 further has a hollow air conduit 56 formed internally therein, which communicates with the inlet 58 for receiving pressurized air from a source P. The source P is connected to the inlet 58 by a conventional compressed air line 57 (FIG. 3). The source P may be a compressor pump, a pressure tank, or other appropriate source. Air under pressure from the source P, coming into the plug 22 through the air line 57, is selectively controllable by the control box 32 at a second flow control valve 60 (FIG. 3). Like the first flow control valve 38, the second flow control valve 60 may be an electric solenoid valve, diaphragm, or other type of electrically controllable valve. The air conduit 56 is also in fluid communication with a plurality of connecting tubes 61, which interconnect the air conduit 56 to the exterior surface 64 of the plug 22. The connecting tubes 61 terminate at a plurality of openings 62, which are spaced around the exterior surface 64 of the plug 22. The openings 62 are provided to provide air pressure to the space 66 (FIG. 3) between the plug 22 and the thermoplastic sheet 28, when the plug 22 is fully nested into the mold 18 in a thermoforming operation. The upper surface 55 of the plug 22 does not have any openings formed therein, other than the inlet 58. Since both sides of the backrest section 50 of the plug contact the thermoplastic sheet 28, they both are provided with openings 62 to expel air therefrom.

PLUG-ASSISTED METHOD OF USE

In use, the timing, duration, and sequence of steps in a thermoforming operation, using the apparatus 10 according to the present invention, are all controlled by the control box 32 which, as noted above, preferably contains a computer. First, a thermoplastic sheet 28 is placed into the clamp assembly 12 and is clamped firmly therein around all sides thereof. In practicing the method of plug-assisted thermoforming according to the present invention, the sheet 28 may be placed into the clamp assembly manually, robotically, or continuously. Then, the upper and lower heaters 14, 16 are activated to heat the thermoplastic sheet to an optimal molding temperature.

When the proper temperature is reached, the heaters 14, 16 are moved away from the thermoplastic sheet 28, and the mold 18 and plug 22 begin to move towards one another, as shown by the arrows in FIG. 1. The tip of the backrest section 50 of the plug 22 then contacts the thermoplastic sheet 28, and begins to stretch it out, at the same time pushing it downwardly into the mold 18 as shown in FIG. 2. The plug continues to move slowly and nestingly into the mold cavity 45, until the flange 54 is pinching the thermoplastic sheet 28 between it and the top edge 44 of the mold 18, as shown in FIG. 3.

At that point, movement of both the mold 18 and the plug 22 stops, and the first and second flow control valves 38, 60 are opened briefly. Opening of the first and second flow control valves 38, 60 places pressurized air above the thermoplastic sheet 28 via the openings 62 of the plug 22, and further creates a partial vacuum below the thermoplastic sheet 28 via the apertures 40 of the mold 18. Both the pressure and vacuum act in concert to force the sheet 28 into close contact with the inner surface of the mold 18, and to transform it into the shape it will have as a finished seat cover 20. During this stage, the thermoplastic sheet 28 moves from the orientation thereof shown in solid lines in FIG. 3, to the orientation shown in phantom, which is substantially the same as that shown in the finished seat cover 20 depicted in FIG. 4.

After the sheet 28 attains its final orientation, it is cooled in place in the mold 18, and once it is sufficiently cool, the plug 22 is removed from the mold and the thermoplastic sheet 28 is then also removed from the mold, in turn. The molded sheet 28 is then trimmed to size, and may be further modified as desired to form a finished seat cover 20.

METHOD OF VACUUM FORMING A SEAT COVER USING A SINGLE MOLD

As noted hereinabove, and as shown in FIGS. 5–8, the female mold 18 may be used, in a vacuum forming process, without requiring the presence of the male plug 22. In such a vacuum forming process, once again, the timing, duration, and sequence of steps are all controlled by the control box 32.

First, a thermoplastic sheet 128 is placed into the clamp assembly 12 and is clamped firmly therein around all sides thereof Then, the upper and lower heaters 14, 16 are activated to heat the thermoplastic sheet to an optimal molding temperature. When the proper temperature is reached, the heaters 14, 16 are moved away from the thermoplastic sheet 128, and the mold 18 begins to move upwardly toward the thermoplastic sheet, as shown by the arrow in FIG. 5. When the upper edge 44 of the mold 18 contacts the sheet 128, the mold immediately stops moving.

Figure 6:
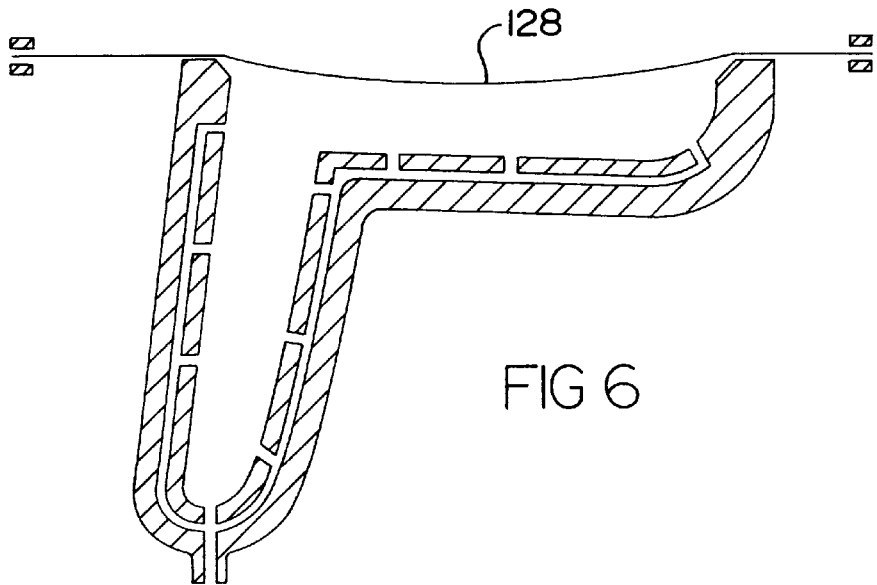

As soon as this contact is effected, an airtight seal is formed between the heat-softened plastic sheet 128 and the mold 18, the first flow control valve 38 is opened by the control box 32, and the vacuum source V is activated to begin evacuating the interior cavity 45 of the mold 18. Softened by heat, the material of the thermoplastic sheet 128 begins to be pulled and stretched downwardly by the vacuum therebelow, as shown in FIG. 6. As the pressure drops, or stated otherwise, as the level of vacuum increases inside the mold cavity 45, the thermoplastic sheet 128 continues to stretch downwardly to conform to the shape of the mold cavity, first to the orientation shown in phantom in FIG. 7, then further, to the orientation shown in solid lines in FIG. 7, and finally, taking up a configuration closely conforming to the interior surface 42 of the mold 18, as shown in FIG. 8. The mold 18 is then cooled, and the seat cover is removed therefrom and trimmed as required. Other post-molding modifications may be made as desired, and the finished product of the vacuum forming process will be substantially similar to the seat cover 20 shown in FIG. 4.

SEAT COVER

The finished seat cover 20 includes a base section 21 for protectively covering a base portion of a vehicular seat, and a backrest section 23 for protectively covering a backrest portion of a vehicular seat. It is an important feature of the present invention that the mold be configured in such a way that the finished seat cover 20 be made seamless. This is accomplished in order to avoid any possibility of contamination of the seat cover, during its useful life in a vehicle, by pathogens such as bacteria, viruses, fungi, or other microoraganisms. The seamless feature of the seat cover 20 also makes it easy to clean off, should any pathogenic or otherwise dangerous material become spilled thereon.

Although the present invention has been described herein with respect to a preferred embodiment thereof, the foregoing description is intended to be illustrative, and not restrictive. Those skilled in the art will realize that many modifications of the preferred embodiment could be made which would be operable. All such modifications which are within the scope of the claims are intended to be within the scope and spirit of the present invention.

Having, thus, described the invention, what is claimed is:

1. A vehicular seat cover, the cover comprising:

(a) a thermoplastic base section; and (b) a thermoplastic backrest section formed unitarily and integrally with the base section, wherein the base section and backrest section are preformed and shaped to conform and fit about a specifically configured vehicle seat, whereby the seat cover is nonporous and seamless.

2. The seamless vehicular seat cover of claim 1, wherein the seat cover is a product of a thermoforming process comprising a vacuum forming operation.

3. The seamless vehicular seat cover of claim 1, wherein the seat cover is a product of a process comprising a plug-assist forming operation.

\* \* \* \* \*